United States Patent
Al-Telmissani

(10) Patent No.: US 8,209,174 B2
(45) Date of Patent: Jun. 26, 2012

(54) SPEAKER VERIFICATION SYSTEM

(75) Inventor: Essam Abed Al-Telmissani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 659 days.

(21) Appl. No.: 12/386,520

(22) Filed: Apr. 17, 2009

(65) Prior Publication Data

US 2010/0268537 A1    Oct. 21, 2010

(51) Int. Cl.
*G10L 17/00* (2006.01)
(52) U.S. Cl. .......................... 704/246; 704/238; 704/239
(58) Field of Classification Search .................. 704/238, 704/239, 270, 273, 243, 244, 246, 255, 231, 704/235
See application file for complete search history.

(56) References Cited

U.S. PATENT DOCUMENTS

| | | | |
|---|---|---|---|
| 6,076,055 | A | 6/2000 | Bossemeyer, Jr. et al. |
| 6,088,669 | A | 7/2000 | Maes |
| 6,161,090 | A | 12/2000 | Kanevsky |
| 6,256,609 | B1 | 7/2001 | Byrnes |
| 7,171,360 | B2 | 1/2007 | Huang et al. |
| 7,490,043 | B2 * | 2/2009 | Tavares .......................... 704/273 |
| 2004/0107099 | A1 | 6/2004 | Charlet |
| 2006/0178885 | A1 | 8/2006 | Tavares |
| 2007/0219801 | A1 * | 9/2007 | Sundaram et al. ............ 704/270 |
| 2008/0015852 | A1 | 1/2008 | Kruger |
| 2008/0195389 | A1 | 8/2008 | Zhang |

FOREIGN PATENT DOCUMENTS

WO    WO-2005/055200 A1    6/2005

OTHER PUBLICATIONS

International Preliminary Report on Patentability, for counterpart PCT/US10/30422.
Joseph P. Campbell, Jr., Speaker Recognition: A Tutorial, Proc. IEEE, vol. 85, No. 9 (Sep. 1997).
Svetoslav Marinov, Text Dependent and Text Independent Speaker Verification Systems: Technology and Applications, Institutionen for Sprak Hogskolan i Skovde (Feb. 26, 2003).
B.S. Atal & S.L. Hanauer, Speech Analysis and Synthesis by Linear Prediction of the Speech Wave, 50 J. Acoustical Soc'y Am. 637 (1971), vol. 50, p. 637-655.
Medha Pandit & Josef Kittler, Feature Selection for a DTW-Based Speaker Verification System, 1998 IEEE Int'l Conf. Acoustics, Speech & Signal Processing, p. 769-772.
Aaron E. Rosenberg et al., Speaker Verification Using Minimum Verification Error Training, 1998 IEEE Int'l Conf. Acoustics, Speech & Signal Processing, p. 105-08.
ChiWei Chi et al., An HMM Approach to Text-Prompted Speaker Verification, 1996 IEEE Int'l Conf. Acoustics, Speech & Signal Processing, p. 673-76.
M.E. Forsyth and M.A. Jack, Discriminating Semi-Continuous HMM for Speaker Verification, 1994 IEEE Int'l Conf. Acoustics, Speech & Signal Processing, vol. 1, p. 313-16.

(Continued)

*Primary Examiner* — Huyen X. Vo
(74) *Attorney, Agent, or Firm* — Abelman, Frayne & Schwab

(57) ABSTRACT

A text-independent speaker verification system utilizes mel frequency cepstral coefficients analysis in the feature extraction blocks, template modeling with vector quantization in the pattern matching blocks, an adaptive threshold and an adaptive decision verdict and is implemented in a stand-alone device using less powerful microprocessors and smaller data storage devices than used by comparable systems of the prior art.

16 Claims, 2 Drawing Sheets

OTHER PUBLICATIONS

Qi Li, A Detection Approach to Search-Space Reduction for HMM State Alignment in Speaker Verification, 2001 IEEE Transactions Speech & Audio Processing, p. 569-578.

Chun-Nan Hsu et al., Speaker Verification without Background Speaker Models, 2003 IEEE Int'l Conf. Acoustics, Speech & Signal Processing. vol. II, p. 233-36.

Xiaohan Li et al., Improving Speaker Verification With Figure of Merit Training, 2002 IEEE Int'l Conf. Acoustics, Speech & Signal Processing v. I, p. 693-96.

Cheedella S. Gupta et al., Autoassociative Neural Network Models for Online Speaker Verification Using Source Features from Vowels, Proc. 2002 Int'l Joint Conf. Neural Network.

Vincent Wan & Steve Renals, Speaker Verification Using Sequence Discriminant Support Vector Machines, 2005 IEEE Transactions Speech & Audio Processing, vol. 13, issue 2, p. 20.

Sammy Bengio & Johnny Mariethoz, Learning the Decision Function for Speaker Verification, 2001 IEEE Int'l Conf. Acoustics, Speech & Signal Processing, vol. I, p. 425.

Vincent Wan & William M. Campbell, Support Vector Machines for Speaker Verification and Identification, Proc. 2000 IEEE Signal Processing Soc'y Workshop, vol. 2, p. 775-784.

Kwok K. Ang & Alex C. Kot, Speaker Verification for Home Security System, Proc. 1997 IEEE Int'l Symp. Consumer Electronics, p. 27-30.

B. A. Fette et al., CipherVOX: Scalable Low-Complexity Speaker Verification, 2000 IEEE Int'l Conf. Acoustics, Speech & Signal Processing, vol. 6, p. 3634-37.

Yiying Zhang et al., Speaker Verification by Removing Common Information, Electronics Letters, vol. 35, issue 23, p. 2009-011.

A. M. Ariyaeeinia & P. Sivakumaran, Speaker Verification Based on the Orthogonalisation Technique, 1995 Eur. Convention on Security & Detection, p. 101-05.

Li Tan & Montri Karnjanadecha, Modified Mel-Frequency Cepstrum Coefficient, 2003 Proc. Info. Engineering Postgraduate Workshop (Songkhla, Thailand), p. 127-130.

Jashmin K. Shah et al., Robust Voiced/Unvoiced Classification Using Novel Features and Gaussian Mixture Model, 2004 IEEE Int'l Conf. Acoustics, Speech & Signal Processing.

Frédéric Bimbot et al., A Tutorial on Text-Independent Speaker Verification, EURASIP J. on Applied Signal Processing (Hindawi Publishing Corp.), 2004:4, p. 430-451.

Mohamed F. Benzeghiba & Nerve Bourlard, Hybrid HMM/ANN and GMM Combination for User-Customized Password Speaker Verification, 2003 IEEE Int'l Conf. Acoustics, Speech & Signal.

Jayant M. Naik, Speaker Verification: A Tutorial, IEEE Comm. Mag., vol. 28, Jan. 1990, p. 42-48.

Gurmeet Singh et al., Vector Quantization Techniques for GMM Based Speaker Verification, 2003 IEEE Int'l Conf. Acoustics, Speech & Signal Processing, vol. 2, p. 65-68.

Gu Yong & T. Thomas, A Hybrid Score Measurement for HMM-Based Speaker Verification, 1999 IEEE Int'l Conf. Acoustics, Speech & Signal Processing, vol. 1, p. 317-320.

Michael A. Lund et al., A Distributed Decision Approach to Speaker Verification, 1994 IEEE Int'l Conf. Acoustics, Speech & Signal Processing, vol. 1, p. 141-44.

E.A. Logan et al., A Real Time Speaker Verification System Using Hidden Markov Models, 1991 IEE Colloquium Sys. & Applications of Man-Machine Interaction Using Speech I/O, p.

S. Bhattacharyya et al., Ideal GMM Parameters & Posterior Log Likelihood for Speaker Verification, 2001 Proc. IEEE Signal Processing Soc'y Workshop, p. 471-480.

Eliathamby Ambikairajah & Anthony Kelly, A Speaker Verification System Based on a Neural Prediction Model, Singapore ICCS/ISITA 1992, 'Communications on the Move,' vol. 2, p.

Ig-Tae Um et al., Text Independent Speaker Verification Using Modular Neural Network, 2000 Proc. IEEE-INNS-ENNS Int'l Joint Conf. Neural Networks, vol. 6, p. 97-102.

Han-Sheng Liou & Richard J. Mammone, Speaker Verification Using Phoneme-Based Neural Tree Networks and Phonetic Weighting Scoring Method, Proc. 1995 IEEE Workshop Neural Netw.

Hou Fenglei & Wang Bingxi, Text-Independent Speaker Verification Using Speaker Clustering and Support Vector Machines, 6th Int'l Conf. Signal Processing (2002), vol. 1, p. 456.

M. Savic & J. Sorensen, Phoneme Based Speaker Verification, 1992 IEEE Int'l Conf. Acoustics, Speech & Signal Processing, vol. 2. p. 165-68.

Rafid A. Sukkar et al., Speaker Verification Using Mixture Decomposition Discrimination, 2000 IEEE Transactions Speech & Audio Processing, vol. 8, Issue 3, p. 292-99.

Andrea Lodi et al., Very Low Complexity Prompted Speaker Verification System Based on HMM-Modeling, 2002 IEEE Int'l Conf. Acoustics, Speech & Signal Processing, vol. 4, p. 391.

Bing Xiang & Toby Berger, Efficient Text-Independent Speaker Verification with Structural Gaussian Mixture Models and Neural Network, IEEE Transactions Speech & Audio Processi.

Jayant M. Naik & David M. Lubensky, A Hybrid HMM-MLP Speaker Verification Algorithm for Telephone Speech, 1994 IEEE Int'l Conf. Acoustics, Speech & Signal Processing, vol. i.

Deng Haojiang et al., Combination of Likelihood Scores Using Linear and SVM Approaches for Text-Independent Speaker Verification, 7th Int'l Conf. Signal Processing (2004), vo.

Eddie Wong & Sridha Sridharan, Comparison of Linear Prediction Cepstrum Coefficients and Mel-Frequency Cepstrum Coefficients, Proc. 2001 Int'l Symp. Intelligent Multimedia, Vi.

Pravinkumar Premakanthan & Wasfy B. Mikhael, Speaker Verification/Recognition and the Importance of Selective Feature Extraction: Review, Proc. 44th IEEE 2001 Midwest Symp. on.

International Search Report and Written Opinion, PCT/US 10/30422, mailed Jun. 2, 2010.

Minghui Liu, "A New Hybrid GMM/SVM for Speaker Verification," 18th Int'l Conf. on Pattern Recognition (2006), vol. 4, p. 314-317.

Hui Jiang, "A Bayesian Approach to the Verification Problem," 9 IEEE Transactions Speech & Audio Processing, (Nov. 2001), Issue 8, p. 874-84.

Yiying Zhang, "A Novel Text-Independent Speaker Verification Method Based on the Global Speaker Model," IEEE Transactions Sys., Man & Cybernetics, (Sep. 2000).

Ran D. Zilca, "Text-Independent Speaker Verification Using Covariance Modeling," IEEE Signal Processing Letters, (Apr. 2001), vol. 8, issue 4, p. 97-99.

Ran D. Zilca, "Text-Independent Speaker Verification Using Utterance Level Scoring and Covariance Modeling," IEEE Trans. Speech & Audio Processing, (Sep. 2002), 10:6, p. 36.

Man-Wai Mak, "Estimation of Elliptical Basis Function Parameters by the EM Algorithm with Application to Speaker Verification," IEEE Transactions Neural Networks (Mar. 2000).

Scott Chin, "A Speaker Verification System," Univ. Victoria Dept. Electrical & Computer Engineering (Aug. 2002).

Roland Auckenthaler, "Score Normalization for Text-Independent Speaker Verification Systems," Digital Signal Processing, (2000), vol. 10, p. 42-54.

Bing Xiang, "Text-Independent Speaker Verification with Dynamic Trajectory Model," IEEE Signal Processing Letters, (May 2003), vol. 10, issue 5, p. 141-43.

Yatin Kulkarni, "Biometrics: Speaker Verification," Pattern Recognition & Image Processing Lab, Dept. of Computer Science & Engineering, Michigan State Univ. (Jun. 2004).

* cited by examiner

SPEAKER VERIFICATION SYSTEM

BACKGROUND OF THE INVENTION

1. Field of the Invention

The present invention relates generally to a speaker verification system ("SVS"), and more specifically to a text-independent SVS.

2. Description of the Related Art

The field of speaker verification has gained the interest of researchers and industry, since it is a simple biometric measure that can be used with ease and relatively low implementation costs for personnel authorization purposes. Extensive research has been conducted to identify improved pattern recognition methodologies to enhance the accuracy of speaker verification systems.

Biometric measurements, or "biometrics," allow humans to be recognized by automated electronic means based upon one or more intrinsic and unique physical characteristics. Fingerprints, retina patterns and speech patterns are examples of measurable characteristics that can be used to verify an individual's identity. A very important advantage of biometrics is that the physical characteristics selected cannot be forgotten or transferred to other individuals and cannot easily be mimicked by others. The basic concept of biometrics consists mainly of comparing an individual's characteristic(s) against a recorded reference pattern taken from the claimed identity.

Voice recordings and reproductions cannot easily be used to penetrate sophisticated voice-based security systems. However, there are some drawbacks to the technology, such as fluctuations in voice patterns due to illness, physical exertion, and the like, which can affect the accuracy of the recognition systems. Depending on the security classification and other application requirements, several precautions can be taken to reduce the effect of such fluctuations, such as using high quality microphones and noise cancellers.

There are two types of speaker recognition systems: (a) speaker verification systems, and (b) speaker identification systems.

A speaker verification system determines whether a speaker who provides a voice sample is whom she claims to be, by comparing her speech sample to a speech pattern for the claimed individual. For example, a person seeking access to a secured area can swipe an identification card or enter a personal identification number ("PIN") assigned to a particular employee, leading the system to ask the person for a few seconds of speech. The system will then compare that speech to a pattern that the system had previously established for that employee's speech, and will decide whether the person presenting the card or entering the code is the employee or an imposter.

In contrast, a speaker identification system does not initially focus on one claimed individual, but rather compares a speech sample against a database of speech patterns from a number of speakers to try to attain a match.

A speaker recognition system can be classified as either a text-dependent system ("TDS") or a text-independent system ("TIS").

A TDS requires the speaker to speak certain key words in enrollment and threshold generation stages, and then to repeat some of the same complete words in a verification stage. Thus, a TDS requires a cooperative speaker, and such systems are used primarily to control physical or computer access. Some randomization can be introduced to try to prevent an intruder from recording the speech and playing it back. Thus, in the enrollment stage, the speaker can be asked to recite the numbers "one" through "twenty," and words such as, "Able," "Baker," "Charlie," etc. In the verification stage, the system can prompt the user, e.g., by way of a display monitor, to pronounce "Three Able Five Baker," and upon the next access attempt, "Twenty Charlie Fifteen." A TDS typically requires two to three seconds of speech in each of the stages.

In contrast, a TIS does not rely on matching words being spoken during the verification stage. The enrollment stage requires about 10-30 seconds of speech from the speaker, either with the speaker's voluntary participation, or speech that could even have been recorded surreptitiously. During the verification stage, the system requires 5-10 seconds of speech, which also may have been recorded surreptitiously, and which does not need to be any of the same words recorded during the enrollment stage. Where users are cooperative, a text-independent system can use a fixed text in the enrollment stage. The term "text independent" simply means that there is no requirement that the words proffered during the verification stage match some of those used during the enrollment speech. Text-independent systems are used in forensic and surveillance applications where the system user is not cooperative.

Prior art speaker recognition systems, such as that shown in FIG. 1, typically employ a basic configuration of enrollment, threshold generation and verification stages. Some systems include threshold generation as part of either the enrollment stage or the verification stage, instead of illustrating it as a separate stage. Prior art systems also commonly group the functions to be performed in each stage by functional block.

In the enrollment stage, speech from a particular speaker is entered into the system and the system generates and stores a speaker reference model, which is a codebook containing characteristic speech patterns for given sounds made by a particular speaker.

In the threshold generation stage, additional speech from the same speaker will be entered into the system, with the system establishing a threshold, which is defined as the maximum deviation from the codebook that the system considers to be acceptable.

In the verification stage, a speaker will claim to be a particular individual whose codebook resides in the system. The speaker will make that claim, for example, by swiping an identification card, or by entering an PIN assigned to a particular employee. The system will locate the codebook for the claimed individual and load it into memory. The speaker will provide a speech sample, to which the system applies digital signal processing and feature extraction, after which the system compares the result to the codebook previously established for the claimed individual. If the difference is within the threshold, the system accepts the speaker as the person associated with the codebook. If the difference is outside the threshold, the system rejects the speaker as an imposter.

As noted, the operation of a typical prior art SVS can be divided into a number of functional blocks, in which a known computer device processes information. The Digital Signal Processing ("DSP") blocks appear respectively in all three stages, where they filter and digitize the analog sound waves entering each stage.

Each stage also has a Feature Extraction ("FE") block that derives a lower-dimensional feature space representation of speech elements. This representation will allow for reduced data storage and computing requirements, while still being capable of discriminating between speakers.

Pattern Matching ("PM") blocks are present in the enrollment stage and threshold generation stage, where they create a speaker model. In the enrollment stage, the speaker model is retained as the codebook. In the threshold generation stage, the speaker model is not retained, but is forwarded to a threshold generation block, where it is compared with the codebook and used to establish a threshold.

The feature comparison block, in the verification stage, compares features extracted from the speaker with the codebook established for the claimed identity.

The decision block, in the verification stage, receives the results calculated by the feature comparison block and compares them with the threshold, before deciding whether to accept or reject the claimed identity.

As noted above, a feature extraction technique is utilized in all three stages of an SVS to find a lower-dimensional feature space representation that includes sufficient vectors of information to achieve suitable similarity measurements. The speech signal is a complex function of the speaker's physical characteristics (i.e., vocal tract dimensions and environment) and emotional state (i.e., physical and mental stress). A broad sampling or selection of the acoustic features is critical for the effectiveness of an SVS. Specifically, feature extraction should (a) extract speaker-dependent features from speech that are capable of discriminating between speakers while being tolerant of intra-speaker variabilities; (b) be easily measurable from the speech signal; (c) be stable over time; and (d) not be susceptible to mimicry by impostors.

The feature extraction process can be programmed to identify a number of features including linear predictive coefficients ("LPC"), pitch and pitch contours, format frequency and bandwidth, nasal coarticulation and gain. The effectiveness of an SVS is highly dependent on the accuracy of discrimination of the speaker models obtained from the speech features. The two most popular methods of feature extraction are modeling human voice production, especially using LPC, and modeling the human system of perception by analyzing pitch and pitch contours, especially using mel frequency cepstral coefficient ("MFCC"). The main advantage to MFCC is that the technique accurately approximates the human auditory system, which does not perceive frequency components in speech as following a linear scale.

As noted above, the main objective of pattern matching is to create a speaker model, which in turn is used to formulate a codebook in the enrollment stage and as an input to the threshold generation block in the threshold generation stage. The selection of a proper value for threshold is vital, as it determines whether an identity claim with a reasonable variance will be accepted or rejected. The most common pattern matching methods are stochastic modeling and neural networks. Template modeling and other methods have also been used, though less commonly.

These prior art systems typically require powerful microprocessors and large amounts of computer memory. In addition, the only known commercial speaker verification system is a text-dependent system. It would be highly desirable to have a text-independent speaker verification system that can be implemented with a less powerful microprocessor and smaller data storage device than used by known comparable systems of the prior art.

SUMMARY OF THE INVENTION

The present invention comprehends a speaker verification system that includes template modeling with vector quantization in the pattern matching blocks, an adaptive threshold and an adaptive decision verdict. The system produces a high degree of accuracy that is comparable to other speaker verification systems, while allowing for an efficient implementation with less powerful microprocessors and smaller data storage devices.

These and other objects and advantages of the present invention will become more apparent upon consideration of the attached drawings and the following detailed description of the preferred embodiments which are provided by way of illustration and example, but: are not to be construed in any way as limiting the invention.

BRIEF DESCRIPTION OF THE DRAWINGS

The present invention will be described in further detail below and with reference to the accompanying drawings, in which.

DETAILED DESCRIPTION OF THE INVENTION

Figure 1:
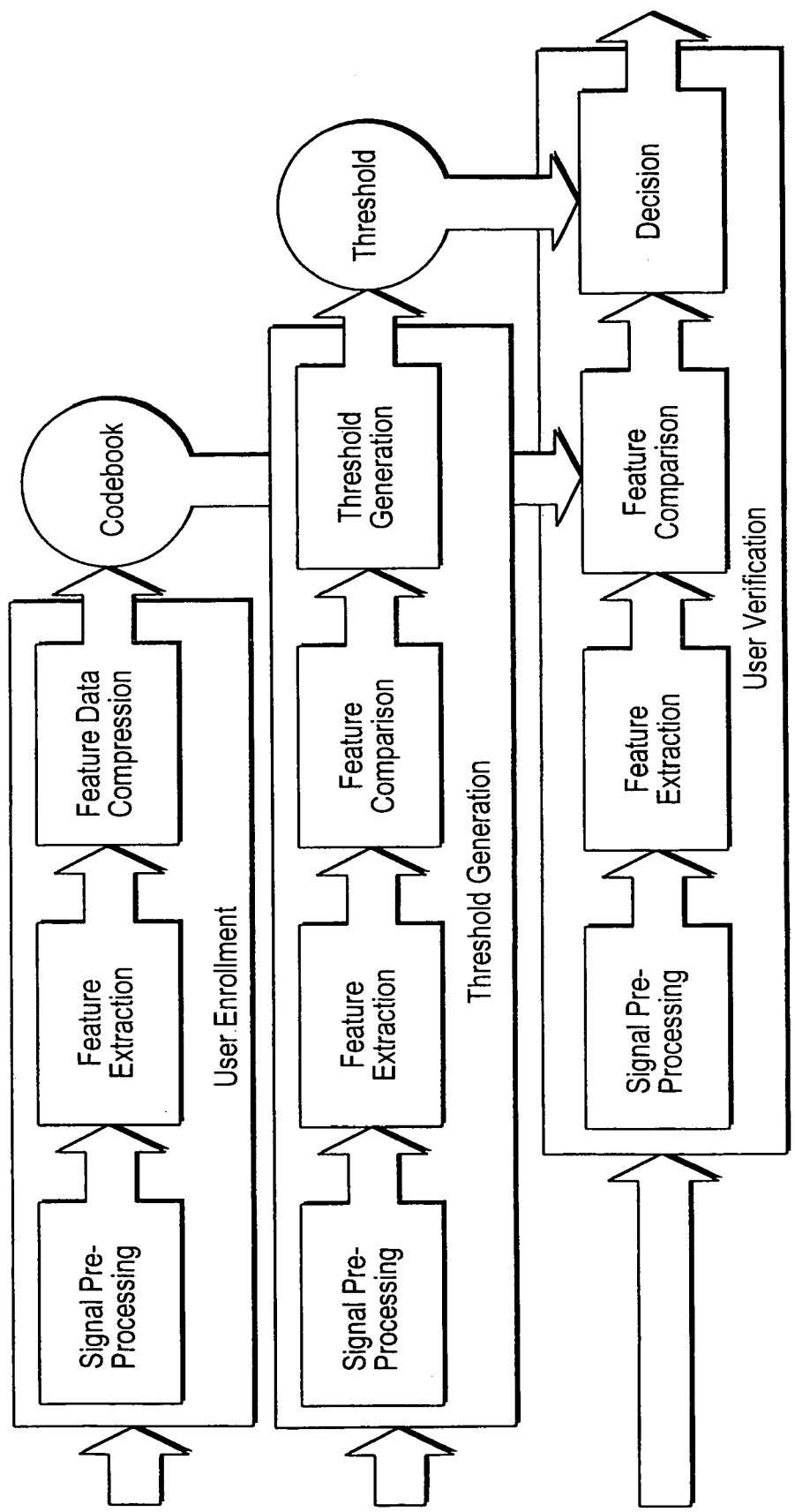
FIG. 1 is a block diagram of a prior art speaker verification system.
Figure 2:
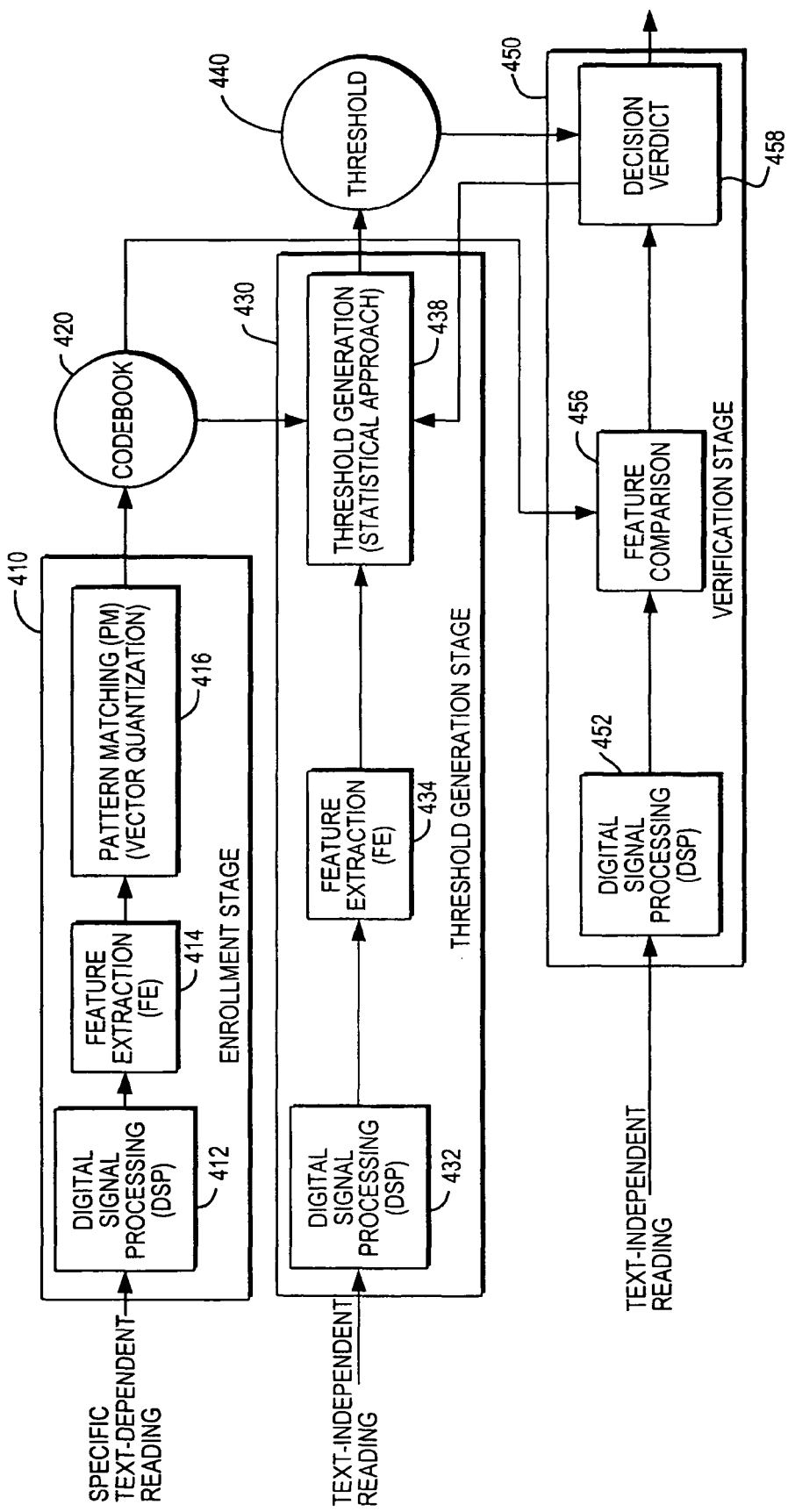
FIG. 2 is a block diagram of the speaker verification system of this invention.

The discussion of the prior art provided above included references to FIG. 1. The present invention will be described in further detail with reference to FIG. 2, which is a block diagram for the speaker verification system. As with the prior art system, this system consists of an enrollment stage 410, a threshold generation stage 430 and a verification stage 450. These stages in turn each have a number of functional blocks, with a functional block representing known computer processing devices, though a broad range of electronic and mathematical techniques can be used in a particular functional block.

The Digital Signal Processing ("DSP") blocks, 412, 432, 452, appear respectively in all three stages. The DSP blocks receive a signal representing sound. This signal representing sound can come from a broad range of devices, such as directly from a microphone, from an amplifier, from a hard disk drive, and so forth. The DSP blocks filter and digitize the analog sound waves entering each stage. In a preferred embodiment, the input speech wave files are normalized to −10 db.

The enrollment stage 410 and threshold generation stage 430 have Feature Extraction ("FE") blocks, 414, 434, respectively. In the verification stage 450, feature extraction is conducted as part of the feature comparison block 456. This invention utilizes the MFCC technique in feature extraction, although, alternatively, LPC can be used.

Enrollment stage 410 is supplied with a Pattern Matching ("PM") block 416, which creates a speaker model. In the threshold generation stage 430, pattern matching is conducted as part of threshold generation block 438 to generate the initial value of the threshold 440. The method, apparatus and system of this invention uses vector quantization as a template modeling technique to develop a pattern model, leading to the codebook. In a preferred embodiment, the invention uses the known LBG algorithm (named for the algorithm's developers, Linde, Buzo and Gary).

In initially training the system, the speaker recites a number of specific speech combinations in two sessions. In a preferred embodiment, the speech combinations are converted into wave files and temporarily stored. In the first session, the first group of speech combinations' wave files are input into the enrollment stage 410, where the DSP block 412 normalizes the wave files and the FE block 414 extracts the acoustic speaker vectors. The resulting vectors are forwarded to pattern matching block 416, which develops a speaker pattern model, which the speaker verification system retains as a codebook 420 for that speaker.

In the second session, the second group of speech combinations' wave files are input into the threshold generation stage 430, where the DSP block 432 normalizes the wave files and the FE block 434 extracts the acoustic speaker vectors. The pattern model is not retained in the threshold generation stage 430, but rather is used in the threshold generation block 438 to generate the initial value of the threshold 440. The threshold generation block 438 calculates the scoring values for each of the second group's wave files, with the Scoring Value (SV) being the mean of the minimum Euclidean distances between the extracted acoustic speaker vectors and the speaker codebook 420. The threshold generation block 438 also calculates the mean and standard deviation for the scoring values, with the resulting scoring value mean and standard deviation being collectively referred to as the speaker voice print values.

It is very important to note that while the threshold generation stage 430 is implemented only once as part of the initial training phase, this stage is also implemented during verifications in order to automatically update the threshold upon the speaker verification system's verification of a speaker's identity. As was noted above in discussing the limitations and problems of the prior art methods, a low threshold resulted in speaker verification systems tending to accept every identity claim, thus making few false rejections, but many false acceptances. In contrast, a high threshold resulted in the systems rejecting most claims, thus making few false acceptances, but making many false rejections. In the prior art systems, the threshold was only revised manually, as when a user felt that he was receiving too many false rejections. This is in contrast with the method of the present invention, in which the threshold is continually revised after each successful test or as periodically decided by the system administrator, to thereby create an adaptive threshold.

The differences between a test speech and the codebook are incorporated into a statistical array after each application of the verification stage when the speaker is correctly verified. That array is then used to recalculate the threshold prior to the next test. In accordance with the method of the invention, the speaker trains the system regularly, and enhanced system accuracy is achieved. In a preferred embodiment, the median of all stored scoring values is used, the selection being based upon the relative simplicity of determining median value. However, other statistical methods can be applied in order to obtain the desired accurate scoring value. This new adaptive threshold is utilized to achieve improved performance with time and to mitigate temporary, but normal, changes in the voice of the speaker due, e.g., to colds, seasonal allergies, emotional upset, stress, and the like.

The threshold can be obtained from the following formula for scoring value:

$$SV \approx \mu - \tau * \sigma \quad (1)$$

Where $\mu$ and $\sigma$ are the mean and standard deviation of the speaker voice print values calculated in the initial training of the system, and $\tau$ is the threshold.

To calculate the threshold, equation (1) is restated as:

$$\tau \approx (\mu - SV)/\sigma \quad (2)$$

When training the system for a new speaker, the initial value of threshold 440 is calculated from the Scoring Value and the voice print values of the second group's wave files. Equation (2) is also used to calculate the adaptive threshold: after the verification stage 450 verifies a speaker's identity, the median of all old and new scoring values that are stored in the statistical array is utilized in the equation, as discussed above.

The matrix calculations required can be implemented in a software program such as MATLAB. The following is a MATLAB code loop that can be used to process the input speech voice against the speaker codebook to find the scoring value:

```
disp('Enrollment stage, speaker voice print generation stage');
for i = 1:n
    file = sprintf('%ss%d.wav', traindir, i);
    [s, fs] = wavrad(file);
    v = mfcc(s, fs);
    for j = 1:length(code)
        d = disteu(v, code(j));   % finding the ED between all input vectors
                                  % and the speaker centroids
        dist = sum(min(d,[ ],2)) / size(d,1); % finding sum of minimum ED
    end
    t(i) = dist;
end
m = mean(t);
```

The feature comparison block 456, in the verification stage 450, compares features extracted from a speaker with the codebook 420 established for the claimed identity.

The decision verdict block 458, in the verification stage 450, receives the results calculated by the feature comparison block 456 and compares them with the threshold 440, before deciding whether to accept or reject the claimed identity.

The goal of speaker verification is to decide whether a given speech utterance has been pronounced by a claimed speaker or by an imposter. Classical speaker verification models are based on statistical models. It is important to determine $P(S_i|X)$, the probability that a speaker $S_i$ has pronounced sentence X. Using Bayes' theorem, the probability can be expressed as:

$$P(S_i \mid X) = \frac{P(X \mid S_i)P(S_i)}{P(X)} \quad (3)$$

To decide whether or not a speaker $S_i$ has pronounced a given sentence X, $P(S_i|X)$ is compared to the probability that any other speaker has pronounced X, which is written as $P(\overline{S}_i|X)$. When $P(\overline{S}_i|X)$ is the same for all speakers $S_i$, it is replaced by speaker independent model $P(\Omega|X)$, where $\Omega$ represents the world of all speakers. The decision rule is then:

$$\text{If } P(S_i|X) > P(\overline{S}_i|X), \text{ then } X \text{ was generated by } S_i. \quad (4)$$

Using equation (3), inequality (4) can then be written as:

$$\frac{P(X \mid S_i)}{P(X \mid \Omega)} > \frac{P(\Omega)}{P(S_i)} = \delta_i \quad (5)$$

Where the ratio of the prior probabilities is usually replaced by a threshold $\delta_i$, since it does not depend on X. Taking the logarithm of (5) leads to the log likelihood ratio:

$$\text{Log } P(X|S_i) - \text{Log } P(X|\Omega) > \text{Log } \delta_i = \Delta_i. \quad (6)$$

To implement this, a model of $P(X|S_i)$ is created for every potential speaker $S_i$, as well as a world model $P(X|\Omega)$, and then the threshold $\Delta_i$ is estimated for each speaker $S_i$. Alternatively, it is often more convenient to search for a unique threshold $\Delta$ that would be speaker-independent. Depending on the task, models can be estimated using different statistical tools, to represent $P(X|S_i)$ and $P(X|\Omega)$. Finally, when all the speaker models and the world model are created, it is required to find the threshold $\Delta_i$ of the decision rule.

Two types of errors can occur in a SVS, these errors are false rejection and the false acceptance, also known as Type I and Type II errors. A false rejection (no-detection) error happens when a valid identity claim is rejected. A false acceptance (false alarm) error consists in accepting an identity claim from an imposter. Both types of error depend on the threshold used in the decision making process. With a low threshold, the system tends to accept every identity claim, thus making few false rejections and many false acceptances. Conversely, with a high threshold, the system will make few false acceptances, but will make many false rejections.

In accordance with the method of the present invention, the calculated threshold is scaled by a user-definable factor to create an adaptive threshold. This adaptive threshold is then added to and subtracted from the previously calculated scoring value to determine the maximum and minimum values, creating an adaptive verdict, which the system can accept or reject based on the new scoring values, as shown in equations (7) and (8).

$$\text{Maximum value}=SV+Factor*Threshold \quad (7)$$

$$\text{Minimum value}=SV-Factor*Threshold \quad (8)$$

Setting the operating point of the system, or setting the decision threshold, is a trade-off between the two types of errors. The user will be in the best position to experimentally tune the user-definable factor until the trained system reaches what the user considers to be an acceptable ratio of false rejections to false acceptances.

As mentioned previously, the two error rates are functions of the decision threshold. It is therefore possible to represent the performance of a system by plotting Pfa as a function of Pfr. This curve, known as the system operating characteristic, is monotonous and decreasing. It has become customary in the prior art to plot the error curve on a normal deviate scale in which case the curve is known as the DET curve. With the normal deviate scale, a speaker recognition system whose true speaker and imposter scores are Gaussians with the same variance will result in a linear curve with slope equal to −1. The more accurate the system, the closer to the origin the curve will be. In practice, the score distributions are not exactly Gaussians, but closely approximate Gaussians. The DET curve representation is therefore more easily readable and allows for a comparison of the system's performance over a large range of operating conditions.

Plotting the error rates as a function of the threshold provides a useful comparison of the efficacy of different methods under laboratory applications. However, this is not suitable for the evaluation of operating systems for which the threshold has been set to operate at a given point. In such a case, systems are evaluated according to a cost function which takes into account the two error rates weighted by their respective costs, that is, C=Cfa Pfa+Cfr Pfr. In this equation, Cfa and Cfr are the costs given to false acceptance and false rejections respectively. The cost function is minimal if the threshold is correctly set to the desired operating point. It is possible to directly compare the costs of two operating systems. If normalized by the sum of the error costs, the cost C can be interpreted as the mean of the error rates, weighted by the cost of each error.

Other measures are sometimes used to summarize the performance of a system in a single figure. A popular one is the Equal Error Rate ("EER") which corresponds to the operating point where Pfa=Pfr. Graphically, it corresponds to the intersection of the DET curve with the first bisector curve. The EER performance measure rarely corresponds to a realistic operating point. However, it is a quite popular measure of the ability of a system to separate imposters from true speakers. Another popular measure is the Half Total Error Rate ("HTER") which is the average of the two error rates Pfa and Pfr. It can be seen as the normalized cost function assuming equal costs for both errors. Finally, a distinction is made between a cost obtained with a system whose operating point has been set up on development data and a cost obtained with posterior minimization of the cost function. The latter is always to the advantage of the system but does not correspond to a realistic evaluation since it makes use of the data. However, the difference between the two costs can be used to evaluate the quality of the decision making module (in particular, it evaluates how well the decision threshold has been set).

In one preferred embodiment of the invention, the codebook, speaker voice print, deviations between tested speech and the codebook, and any calculated threshold are stored in non-volatile memory that is integral with the speaker verification system.

In another preferred embodiment, the codebook, speaker voice print, deviations between tested speech and the codebook, and any calculated threshold are stored in non-volatile memory in a smart card. As used herein, the term smart card includes a pocket-sized card with embedded integrated circuits which can store and process information.

In yet another preferred embodiment of the invention, the codebook, speaker voice print, deviations between tested speech and the codebook, and any calculated threshold are stored in a combination of both non-volatile memory integral with the speaker verification system and non-volatile memory in, for example, a smart card.

The present invention has been described above with reference to several specific embodiments. It will, however, be evident to those of ordinary skill in the art that various modifications and changes can be made thereto without departing from the invention, the scope of which is to be determined by the claims that follow.

What is claimed is:

1. A text-independent speaker verification system comprising:
 a microprocessor;
 an enrollment stage that includes a digital signal processing block, a feature extraction block and a pattern matching block;
 a threshold generation stage that includes a digital signal processing block, a feature extraction block and a threshold generation block; and
 a verification stage that includes a digital signal processing block, a feature comparison block and a decision block;
 wherein the pattern matching block incorporates template modeling with vector quantization; and
 wherein the verification stage incorporates an adaptive decision verdict; and
 wherein the speaker-verification system operates in a first mode of operation and thereafter in a second mode of operation, the first mode of operation comprising:
  the enrollment stage for receiving speech from a known speaker, for processing the received speech, and for generating a codebook and speaker voice print values; and
  the threshold generation stage for receiving additional speech from the known speaker, for processing the additional speech, for comparing the result to the codebook, and for generating and recording a threshold representing an acceptable deviation from the codebook; and the second mode of operation comprising:
    the verification stage for receiving speech, which is purported to be from the known speaker, for processing the speech, for comparing the result to the codebook and the threshold, and for determining whether the speaker is the known speaker or an imposter;
    wherein in the case that the speaker is verified as the known speaker, the verification stage records a deviation between the speech received by the verification stage and the codebook, outputs a deviation message indicating the deviation of the additional speech, and calculates a new threshold from the recorded deviation and from other previously recorded deviations generated from the first and second modes of operation.

2. The text-independent speaker verification system of claim 1 wherein the pattern matching block utilizes an LBG algorithm to perform template modeling with vector quantization.

3. The text-independent speaker verification system of claim 2 in which the codebook, speaker voice print values, threshold, and any recorded deviations calculated from the first mode of operation, the second mode of operation, or both modes of operation are stored in non-volatile memory in the speaker verification system.

4. The text-independent speaker verification system of claim 2 in which the codebook, speaker voice print values, threshold, and any recorded deviations calculated from the first mode of operation, the second mode of operation, or both modes of operation are stored in non-volatile memory in a smart card.

5. The text-independent speaker verification system of claim 2 in which the codebook, speaker voice print values, threshold, and any recorded deviations calculated from the first mode of operation, the second mode of operation, or both modes of operation are stored on a combination of both non-volatile memory in the speaker verification system and non-volatile memory in a smart card.

6. The text-independent speaker verification system of claim 1 in which the codebook, speaker voice print values, threshold, and any recorded deviations calculated from the first mode of operation, the second mode of operation, or both modes of operation are stored in non-volatile memory in the speaker verification system.

7. The text-independent speaker verification system of claim 1 in which the codebook, speaker voice print values, threshold, and any recorded deviations calculated from the first mode of operation, the second mode of operation, or both modes of operation are stored in non-volatile memory in a smart card.

8. The text-independent speaker verification system of claim 1 in which the codebook, speaker voice print values, threshold, and any recorded deviations calculated from the first mode of operation, the second mode of operation, or both modes of operation are stored on a combination of both non-volatile memory in the speaker verification system and non-volatile memory in a smart card.

9. An apparatus for verifying a speaker's identity, comprising:
    a microphone;
    an output device;
    an enrollment stage that includes a digital signal processing block, a feature extraction block and a pattern matching block;
    a threshold generation stage that includes a digital signal processing block, a feature extraction block and a threshold generation block; and
    a verification stage that includes a digital signal processing block, a feature comparison block and a decision block;
    wherein the pattern matching block incorporates template modeling using vector quantization; and
    wherein the verification stage incorporates an adaptive decision verdict; and
    wherein the speaker-verification system operates in a first mode of operation and thereafter in a second mode of operation, the first mode of operation comprising:
        the enrollment stage for receiving speech from a known speaker via the microphone, for processing the received speech, and for generating a codebook; and speaker voice print values; and
        the threshold generation stage for receiving additional speech from the known speaker, for processing the additional speech, for comparing the result to the codebook, and for generating and recording a threshold representing an acceptable deviation from the codebook;
    and the second mode of operation comprising:
        the verification stage for receiving speech, which is purported to be from the known speaker, for processing the speech, for comparing the result to the codebook and the threshold, and for determining whether the speaker is the known speaker or an imposter;
        wherein in the case that the speaker is verified as the known speaker, the verification stage records a deviation between the speech received by the verification stage and the codebook, calculates a new threshold from the recorded deviation and from other previously recorded deviations generated from the first and second modes of operation, and passes data regarding the deviation of the additional speech to the output device, with said output device indicating the deviation of the additional speech.

10. The apparatus of claim 9 in which the pattern matching block utilizes an LBG algorithm to perform template modeling with vector quantization.

11. The apparatus of claim 10 in which the codebook, speaker voice print values, threshold, and any recorded deviations calculated from the first mode of operation, the second mode of operation, or both modes of operation are stored in non-volatile memory in the speaker verification system.

12. The apparatus of claim 10 in which the codebook, speaker voice print values, threshold, and any recorded deviations calculated from the first mode of operation, the second mode of operation, or both modes of operation are stored in non-volatile memory in a smart card.

13. The apparatus of claim 10 in which the codebook, speaker voice print values, threshold, and any recorded deviations calculated from the first mode of operation, the second mode of operation, or both modes of operation are stored on a combination of both non-volatile memory in the speaker verification system and non-volatile memory in a smart card.

14. The apparatus of claim 9 in which the codebook, speaker voice print values, threshold, and any recorded deviations calculated from the first mode of operation, the second mode of operation, or both modes of operation are stored in non-volatile memory in the speaker verification system.

15. The apparatus of claim 9 in which the codebook, speaker voice print values, threshold, and any recorded deviations calculated from the first mode of operation, the second mode of operation, or both modes of operation are stored in non-volatile memory in a smart card.

16. The apparatus of claim 9 in which the codebook, speaker voice print values, threshold, and any recorded deviations calculated from the first mode of operation, the second mode of operation, or both modes of operation are stored on a combination of both non-volatile memory in the speaker verification system and non-volatile memory in a smart card.

\* \* \* \* \*